United States Patent [19]

Marquette

[11] 4,294,478
[45] Oct. 13, 1981

[54] DETACHABLE PROTECTOR FOR STEEL OBJECTS

[76] Inventor: Russell C. Marquette, 2415 E. 15 St., Tulsa, Okla. 74104

[21] Appl. No.: 22,215

[22] Filed: Mar. 19, 1979

Related U.S. Application Data

[63] Continuation of Ser. No. 867,239, Jan. 6, 1978, abandoned.

[51] Int. Cl.³ .............................................. B60R 19/08
[52] U.S. Cl. .............................. 293/128; 293/DIG. 6
[58] Field of Search ........................ 293/102, 120–122, 293/126–128, 142–145, 151–153, 1, DIG. 6

[56] References Cited

U.S. PATENT DOCUMENTS 3,147,176  9/1964  Haslam ..................................... 293/1
3,659,887  5/1972  Marquette ........................... 293/128

Primary Examiner—Douglas C. Butler
Attorney, Agent, or Firm—Head & Johnson

[57] ABSTRACT

An improved detachable protector for steel objects such as automobile doors, appliance doors, file cabinets, or any object which is subject to being struck by anything which would dent or deface the object, the protector being an elongated body composed of magnetic plastic material which adheres by magnetic attraction to ferrous metal, the body being defined in cross-section by a flat part having an upper surface and a bottom surface, the bottom surface being adapted to adhere to the steel object to be protected and the cross-section being further defined by an arcuate portion which extends from the upper surface of the flat part, the width of the arcuate portion being less than the flat part to leave portion of the flat part extending along each side of the arcuate part, and a thin elongated flat metal member positioned within the arcuate part and in engagement with the upper surface of the flat part to enhance the magnetic action of the body and, in the preferred arrangement, having a layer of adhesive on the lower surface of the flat part to help prevent the device from slipping after it is magnetically attached to the body to be protected.

2 Claims, 3 Drawing Figures

DETACHABLE PROTECTOR FOR STEEL OBJECTS

CROSS-REFERENCE TO RELATED APPLICATION

This application is a continuation of application Ser. No. 867,239, filed Jan. 6, 1978, now abandoned.

BACKGROUND OF THE INVENTION

U.S. Pat. No. 3,659,887, issued May 2, 1972, discloses a "Detachable Protector for Steel Bodies." In The commercial application of the protector described in this patent, it has become apparent that the protector must adhere firmly to a car door or other object to be protected with a tenacity so that it can be removed only with significant effort.

It is therefore an object of this invention to provide an improved detachable protector for steel objects.

More particularly, an object of this invention is to provide a protector for steel objects such as automobile or appliance doors, including an arrangement wherein the object is made of magnetic plastic material and wherein the magnetic properties of the plastic material are enhanced by the inclusion of a paramagnetic metal member.

These general objects, as well as other and more specific objects of the invention will be fulfilled in the following description and claims, taken in conjunction with the attached drawings.

DESCRIPTION OF VIEWS

SUMMARY OF THE INVENTION

This invention is directed towards an improved detachable protector for steel objects such as automobile or appliance doors or the like and includes an elongated member which is attracted to the steel object to be protected by its magnetic properties. The object is made primarily of magnetic plastic material; that is, plastic material having paramagnetic powder dispersed therein. In cross-section the elongated member includes a first flat portion having a bottom side and a top side, the bottom side being adapted to engage and adhere to the steel object being protected. Extending from the top side is an arcuate part of a width less than the width of the flat part so that a portion of the flat part extends along either side of the arcuate part. To enhance the magnetic attraction of the device to the steel object being protected, a thin, flat member of paramagnetic material is positioned within the arcuate part and in engagement with the top surface of the flat part. In a preferred arrangement, the bottom surface of the flat part includes a layer of adhesive.

DETAILED DESCRIPTION OF THE PREFERRED EMBODIMENT

Figure 1:
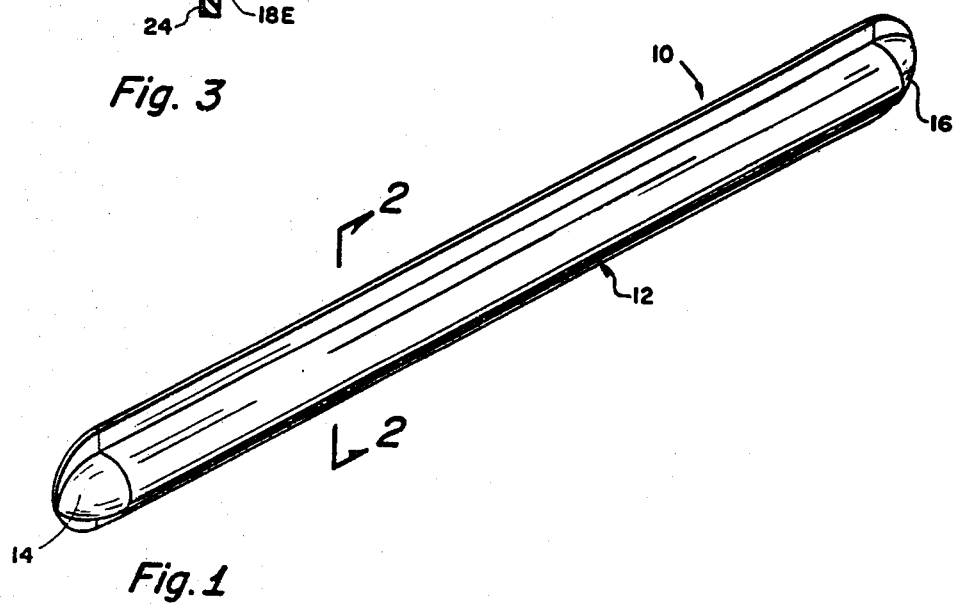
FIG. 1 is an isometric view of the improved detachable protector for steel objects.

Referring now to the drawings and first to FIG. 1, the improved detachable protector is indicated generally by the numeral 10. The protector includes a body portion 12 and decorative end caps 14 and 16.

Figure 2:
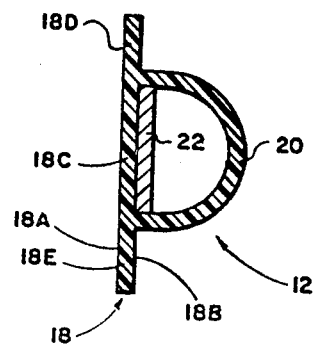
FIG. 2 is a cross-sectional view taken along the line 2—2 of FIG. 1 showing the arrangement wherein the flat part and the arcuate part of the body are integral.

Referring to the cross-sectional view of FIG. 2, the construction of the device is best illustrated. The body generally indicated by 12 includes a thin flat part generally indicated by the numeral 18 having a bottom surface 18A and a top surface 18B. Extending from the top surface is an arcuate part 20.

The width of the arcuate part 20 is less than that of the flat part 18 so that, in effect, the flat part 18 consists of three portions; that is, an intermediate portion 18C and portions which lie beyond the width of the arcuate portion 20, that is, portions 18D and 18E. Thus, in FIG. 2 the body consisting of the flat part 18 and the integral arcuate part 20 formed of magnetic plastic material.

An important element of this invention is the provision of a thin elongated flat paramagnetic metal member 22 which has the purpose of increasing the magnetic attraction of the body 12 to a steel structure by offering a high permeability magnetic flux flow path. Metal member 22 is of a width equal to or slightly less than the internal width of the arcuate part 20 and is positioned within the arcuate part and in engagement with the top surface 18B of the flat part 18. It is not necessary to provide any adhesive or other means of attachment of the metal member 22 to other parts of body 12. The arcuate part 22 mechanically confines the member 22 and the magnetic attraction of the flat part intermediate portion 18C keeps the metal member 22 in engagement with it.

Figure 3:
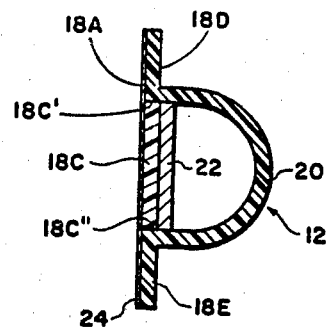
FIG. 3 is a cross-sectional view as in FIG. 2 but showing an arrangement wherein the intermediate portion is separate from the side portions of the flat part.

FIG. 3 shows an alternate cross-sectional arrangement of the body 12. In this arrangement the body arcuate portion 20 and the flat part end portions 18D and 18E are integral while the flat part intermediate portion 18C is formed as a separate member. In this arrangement the intermediate portion 18C is bonded at its edges 18C' and 18C" to the arcuate part 20. As bonded in this position it has the same effect and function as the integral arrangement of FIG. 2. Metal member 22 is positioned in the same way and for the same purpose as with FIG. 2. The external arrangement as seen in FIG. 1 is the same whether the cross-sectional arrangement is that of FIG. 2 or FIG. 3.

FIG. 3 shows an additional alternate arrangement and that is a layer of adhesive 24 on the flat part bottom surface 18A. This adhesive may be in the form of silicone rubber to provide a non-slip surface to help insure that the protector securely adheres to the metal object being protected. Alternately, the layer of adhesive may take the form of a double-backed adhesive tape. In this way the protector is secured to the metal object being protected both by the magnetic properties of the magnetic plastic material of which the flat part 18 and arcuate part 20 are made, enhanced by paramagnetic members 22, plus the adhesive properties of layer 24.

While the dimensions of the protector may vary, as a typical example, the paramagnetic member 22 may be of about 0.03 centimeters thick and about 2.2 centimeters wide.

The invention fulfills the objectives initially set forth and provides a protector having improved capability of adhering to a steel object to be protected.

While the invention has been described with a certain degree of particularity, it is manifest that many changes may be made in the details of construction and the arrangement of components without departing from and the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An improved detachable protector for steel objects comprising:

an elongated body formed of magnetic plastic material which adheres to metal, such as steel, the body in cross-section being defined by a thin flat part having an upper and a lower surface and an arcuate part extending from the flat part upper surface, the width of the arcuate part being less than the width of the flat part, said flat part has side portions along each side of said arcuate part and a mediate portion substantially equal to the internal width of the arcuate part, said portions of said flat part extending along each side of said arcuate part are integral with said arcuate part and wherein the intermediate portion of said flat part is a separate element bonded to said arcuate part, the lower surface being planar; and a thin elongated flat paramagnetic metal member of length substantially equal to the length of the detachable protector, positioned within said arcuate part and in close engagement with the upper surface of the intermediate portion of said flat part, said metal member having width substantially equal to the internal width of the arcuate part at point adjacent the intermediate flat part upper surface.

2. An improved detachable protector for steel objects according to claim 1 including an adhesive layer on said flat part lower surface.

* * * * *